United States Patent
Kawase et al.

(12)

(10) Patent No.: US 6,219,133 B1
(45) Date of Patent: Apr. 17, 2001

(54) SPATIAL OPTICAL TRANSMISSION DEVICE AND METHOD OF SPATIAL OPTICAL TRANSMISSION

(75) Inventors: Takeo Kawase, Cambridge (GB); Shojiro Kitamura, Sawa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/319,185

(22) PCT Filed: Oct. 5, 1998

(86) PCT No.: PCT/JP98/04487
§ 371 Date: Aug. 24, 1999
§ 102(e) Date: Aug. 24, 1999

(30) Foreign Application Priority Data

Oct. 9, 1997 (JP) .................................. 9-293593

(51) Int. Cl.[7] .............. G01B 11/26; G01C 1/00; H04B 10/00
(52) U.S. Cl. ............... 356/139.04; 356/141.3; 356/141.5; 359/159
(58) Field of Search ............ 359/159; 356/141.3, 356/141.5, 139.04

(56) References Cited

U.S. PATENT DOCUMENTS

| 4,096,380 | * | 6/1978 | Eichweber . | |
|---|---|---|---|---|
| 4,134,681 | * | 1/1979 | Elmer . | |
| 4,764,982 | * | 8/1988 | Pfund . | |
| 5,142,400 | * | 8/1992 | Solinsky | 359/159 |
| 5,532,858 | * | 7/1996 | Hirohasai et al. | 359/159 |
| 5,594,580 | * | 1/1997 | Sakanaka et al. | 359/172 |

FOREIGN PATENT DOCUMENTS

| 63-78624 | 4/1988 | (JP) . |
| 1-167738 | 11/1989 | (JP) . |
| 5-183513 | 7/1993 | (JP) . |
| 6-120900 | 1/1994 | (JP) . |
| 8-181654 | 7/1996 | (JP) . |
| 8-204640 | 8/1996 | (JP) . |
| 8-331056 | 12/1996 | (JP) . |

* cited by examiner

Primary Examiner—Stephen C. Buczinski
(74) Attorney, Agent, or Firm—Oliff & Berridge PLC.

(57) ABSTRACT

A spatial optical transmission device and method of spatial optical transmission of a beam type that allow tracking of a light beam by simple control. A plurality of divergent type tracking beams (X1) are emitted from a transmitter (10), and from the distribution of the optical intensity of each of these tracking beams the positional difference between a tracking beam receiver (22) and a datum point is detected, this error information is transmitted from a receiver (20) to the transmitter (10), and using lenses (11, 13), the directions of the optical axes of the tracking beams are changed, and at the same time the direction of the optical axis of a data beam (40) is adjusted.

16 Claims, 9 Drawing Sheets

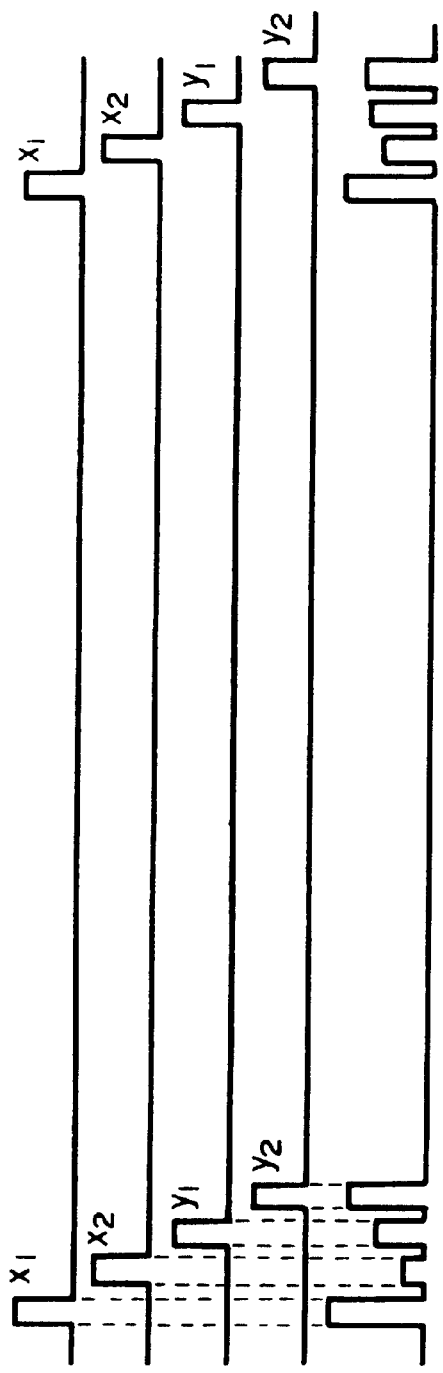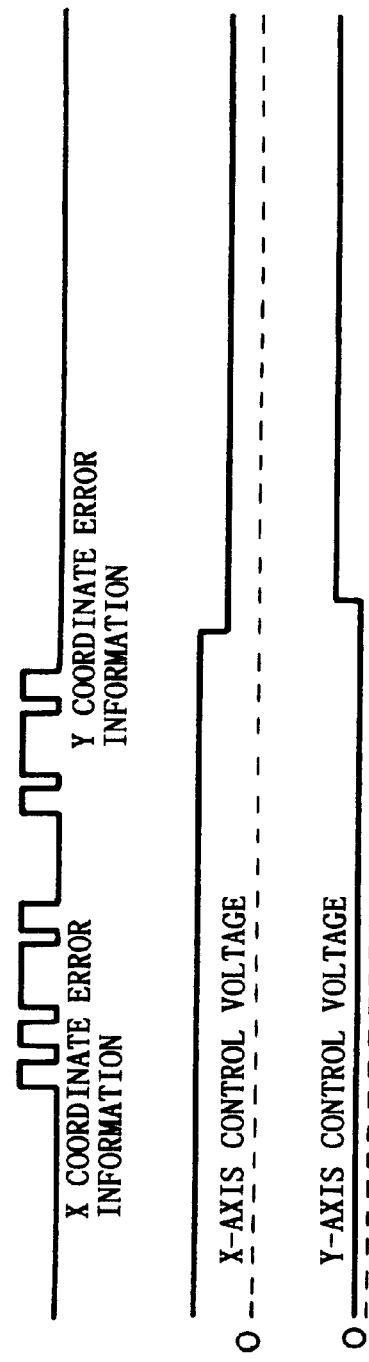

SPATIAL OPTICAL TRANSMISSION DEVICE AND METHOD OF SPATIAL OPTICAL TRANSMISSION

TECHNICAL FIELD

The present invention relates to a spatial optical transmission device and method of spatial optical transmission in which information is transmitted by light passing through space.

BACKGROUND ART

The transmission of information by light passing through space has been implemented for example by IrDA (Infrared Data Association). In particular, the divergent type of transmission method, in which light is transmitted in a divergent beam, does not require optical axis collinearity, and allows the provision of transmitter and receiver to be simple.

With such a divergent type of transmitter, for information to be transmitted optically through space, a large light output is required even for close range operation (not exceeding 1 m), and if the transmission distance is 10 m or so, a light output of at least 500 mW is required.

As the information transfer rate increases, this requires broad band transmission and a high frequency, and to detect light modulated at a high frequency requires the receiving area of the receiving optics to be small, and the electrical capacitance of the element to be small. For example, when transmitting information in the 1-GHz waveband, if a photodiode is used as the photodetector, light-receiving area must be not more than $0.1\ mm^2$. As a result, for broad band optical transmission, because the light-receiving area is small, a larger light output is required.

On the other hand, in the beam type of transmission method in which the light is transmitted along a straight line, the light output can be less than for the divergent type, but the alignment of the optical axis is difficult. In particular, if the positions of the transmitter and receiver move, a mechanism for following the light beam is required. As the mechanism for following the light beam, for example, Japanese Patent Application Laid-Open No. 8-181654, discloses that an optical axis is adjusted by detecting a target to which the light beam is directed on the basis of image information obtained by using a lens and a charge-coupled device (CCD).

However, not only does such a CCD have a high power consumption, but it is not practical for the transmitter to be combined with a complex element such as a CCD, and moreover, the analysis of the image information, the detection of the target, and control of the direction of the light beam require a complicated algorithm.

The present invention solves the above-mentioned problems, and provides a beam type of spatial optical transmission device and method of spatial optical transmission such that the light beam can be tracked with simple control.

DISCLOSURE OF THE INVENTION (1) A spatial optical transmission device of the present invention comprises:
a transmitter which has a plurality of tracking beam transmitters of a divergent type for emitting light at a wide angle, a data beam transmitter of a beam type for emitting light at a narrow angle, an error information beam receiver, and an optical axis control section; and
a receiver which has a tracking beam receiver, a data beam receiver, an error information generation section, and an error beam transmitter of a divergent type;

wherein the tracking beam transmitters emit light beams toward a coordinate plane that has a plurality of coordinate axes and has a fixed relative positional relation with the tracking beam transmitters; the optical axes of at least two of the light beams emitted from the tracking beam transmitters are placed at different positions on each coordinate axis; and adjacent light beams among the light beams partially overlap on one of the coordinate axes, the optical intensity of each of the adjacent light beams showing uneven distribution;

wherein the tracking beam receiver is positioned in the coordinate plane, receives the light beams from the tracking beam transmitters, and detects the intensity of each of light beams thereof;

wherein the error information generation section calculates positional difference between the tracking beam receiver and a datum point of the coordinate plane based on the detected intensity of the light beams, and generates error information;

wherein the error information beam transmitter transmits the error information to the error information beam receiver; and wherein the optical axis control section controls the optical axes of the light beams from the tracking beam transmitters based on the error information so that the tracking beam receiver is positioned at the datum point in the coordinate plane, and also controls the optical axis of the light beam from the data beam transmitter to correspond with the data beam receiver.

According to the present invention, a beam of light is transmitted from the tracking beam transmitter to the tracking beam receiver. This beam of light is of the divergent type, so that even if the optical axis is displaced somewhat, the light can be received by the tracking beam receiver.

In the present invention, a coordinate plane including a plurality of coordinate axes is established. This coordinate plane has a fixed positional relation with the tracking beam transmitter, and the optical axes of a plurality of light beams are placed at different positions on each coordinate axis, and adjacent light beams partially overlap. Further, the optical intensity of each light beam from the tracking beam transmitter shows uneven distribution along the coordinate axis. Therefore, by comparing the intensities of a plurality of light beams partially overlapping along the coordinate axis, the position of the tracking beam receiver in the coordinate plane can be detected.

The error information generation section, based on the light intensities indicating the position of the tracking beam receiver, calculates the positional difference between a previously determined datum point and the position of the tracking beam receiver. The error information beam transmitter transmits the error information to the error information beam receiver of the transmitter.

In the transmitter, based on the error information, the optical axis of the light beam from the tracking beam transmitter is controlled, and at the same time the optical axis of the light beam from the data beam transmitter is controlled.

With the above control carried out, the optical axis of the light beam from the data beam transmitter can be aligned with the data beam receiver. According to the present invention, since the tracking beam receiver only detects optical intensities, a large amount of electrical power is not required, and the algorithm for calculating the error information is not complex. In this way, with simple control, the light beam from a data beam transmitter can be tracked.

(2) In the above spatial optical transmission device, the intensity of each of the light beams emitted from the tracking beam transmitters may be distributed such that the intensity decreases further from the optical axis.

(3) In the above spatial optical transmission device, the light beams from the tracking beam transmitters may be emitted sequentially one at a time. In this way, the intensity of each beam can be detected.

(4) In particular, the error information may be generated after signals based on all of the light beams emitted one at a time have been sequentially sampled and latched.

(5) In the above spatial optical transmission device, the error information generation section, based on the detected intensity of the light beams, may generate an intensity signal for each of the tracking beam transmitters, calculate the difference in the intensity signal for light beams whose optical axes are positioned on the same coordinate axis, and generate coordinate error information for each coordinate axis; and the error information may comprise all of the coordinate error information.

By this means, the positional difference between the tracking beam receiver and the datum point can be calculated.

(6) The above spatial optical transmission device may further comprise at least one lens through which the light beams from the tracking beam transmitters and the data beam transmitter pass; and the optical axis control section may drive the lens, and control the optical axes of the light beams from the tracking beam transmitters and the data beam transmitter.

By this means, the direction of the optical axes can be controlled through the lens.

(7) In the spatial optical transmission device of (5) above, the optical axis control section may move the lens in a translation movement. The lens can change the direction of the optical axes by a translation movement along.

(8) To move the lens in a translation movement, the optical axis control section may include an electromagnetic actuator.

(9) In the spatial optical transmission device of any of (1) to (5) above, the optical axis control section may include a galvanometer mirror which reflects the light beams from the tracking beam transmitters and the data beam transmitter, and changes the direction of the optical axes of the light beams.

By this means, the reflection angle of light is changed, whereby the direction of the optical axes can be changed.

(10) In the above spatial optical transmission device, at least one of the tracking beam transmitter and the data beam transmitter may be a light emitting portion of a surface emitting laser.

A surface emitting laser allows a plurality of light emitting portions to be formed easily, and since the light beam directions can be aligned, is applicable to the present invention.

(11) In the spatial optical transmission device of (10) above, the surface emitting laser may include a plurality of the light emitting portions; and one of the light emitting portions may form the data beam transmitter, while the remainders may form the tracking beam transmitters.

By this means, both the data beam transmitter and the tracking beam transmitter can be formed in the surface emitting laser. It should be noted that whereas one light emitting portion is formed to emit light at a narrow angle corresponding to the data beam transmitter, the remainders of the light emitting portions emit divergent light, corresponding to the divergent tracking beam transmitter.

(12) In the method of spatial optical transmission of the present invention, a plurality of divergent tracking beams are emitted at a wide angle from a transmitter, having a fixed relative positional relation with a plurality of coordinate axes of a coordinate plane;

the tracking beams are received by a light receiving portion of a receiver on the coordinate plane, and the positional difference between the light receiving portion and a datum point is calculated and error information generated;

the error information is transmitted from the receiver to the transmitter;

based on the error information in the transmitter optical axes of the tracking beams are controlled, and an optical axis of data beam emitted at a narrow beam is controlled;

the optical axes of at least two of the tracking beams are placed on each coordinate axis at linearly different positions;

adjacent tracking beams among the tracking beams partially overlap on one of the coordinate axes, the optical intensity of each of the adjacent tracking beams shows uneven distribution, the intensity is detected by means of reception of the tracking beams by the light receiving portion of the receiver, and the positional difference between the light receiving portion and a datum point on the coordinate plane is calculated based on the detected intensity to generate the error information; and based on the error information, the optical axes of the tracking beams are controlled so that the light receiving portion is positioned at the datum point, and the optical axis of the data beam is also controlled.

According to the present invention, a plurality of divergent type tracking beams are received by a light receiving portion in the receiver. The tracking beams partially overlap along a coordinate axis, and the optical intensity of each tracking beam is unevenly distributed. Therefore, by comparing the intensities of the partially overlapping light beams, the position of the light receiving portion that receives the tracking beams in the receiver can be detected. Also, the positional difference between the light receiving portion and a given datum point can be calculated to obtain the error information.

When the optical axes of the tracking beams are controlled based on the error information, since the positional relation of the coordinate plane and the tracking beams is fixed, the position of the light receiving portion for receiving the tracking beams in the receiver moves relatively. Then by causing the light receiving portion to coincide with the datum point, the optical axis of the data beam can be controlled.

(13) In the above method of spatial optical transmission, each tracking beam may have a distribution such that the intensity decreases further from the optical axis.

(14) In the above method of spatial optical transmission, the tracking beams may be emitted sequentially one at a time. By this means, the intensity of each beam can be detected.

(15) In the method of spatial optical transmission of any of (12) to (14) above, based on the detected intensity of the tracking beams, an intensity signal for each tracking beam may be generated, the difference in the intensity signal for the tracking beams whose optical axes are positioned on the same coordinate axis may be calculated, and coordinate error information for each coordinate axis may be generated; and the error information may comprise all of the coordinate error information.

By this means, the positional difference between the light receiving portion for receiving the tracking beams and the datum point can be calculated.

(16) In the method of spatial optical transmission of (15) above, the intensity of each tracking beam may be detected as an analog signal, the analog signal may be converted to a digital signal to be used to calculate the error information, and in the transmitter the error information may be converted to an analog signal to be used to control the optical axes of the tracking beams and the data beam.

BRIEF DESCRIPTION OF THE DRAWINGS

FIGS. 4A to 4D illustrate the effect of the first embodiment;

BEST MODE FOR CARRYING OUT THE INVENTION

The present invention is now described in terms of a number of preferred embodiments, with reference to the drawings.

First Embodiment

Figure 1:
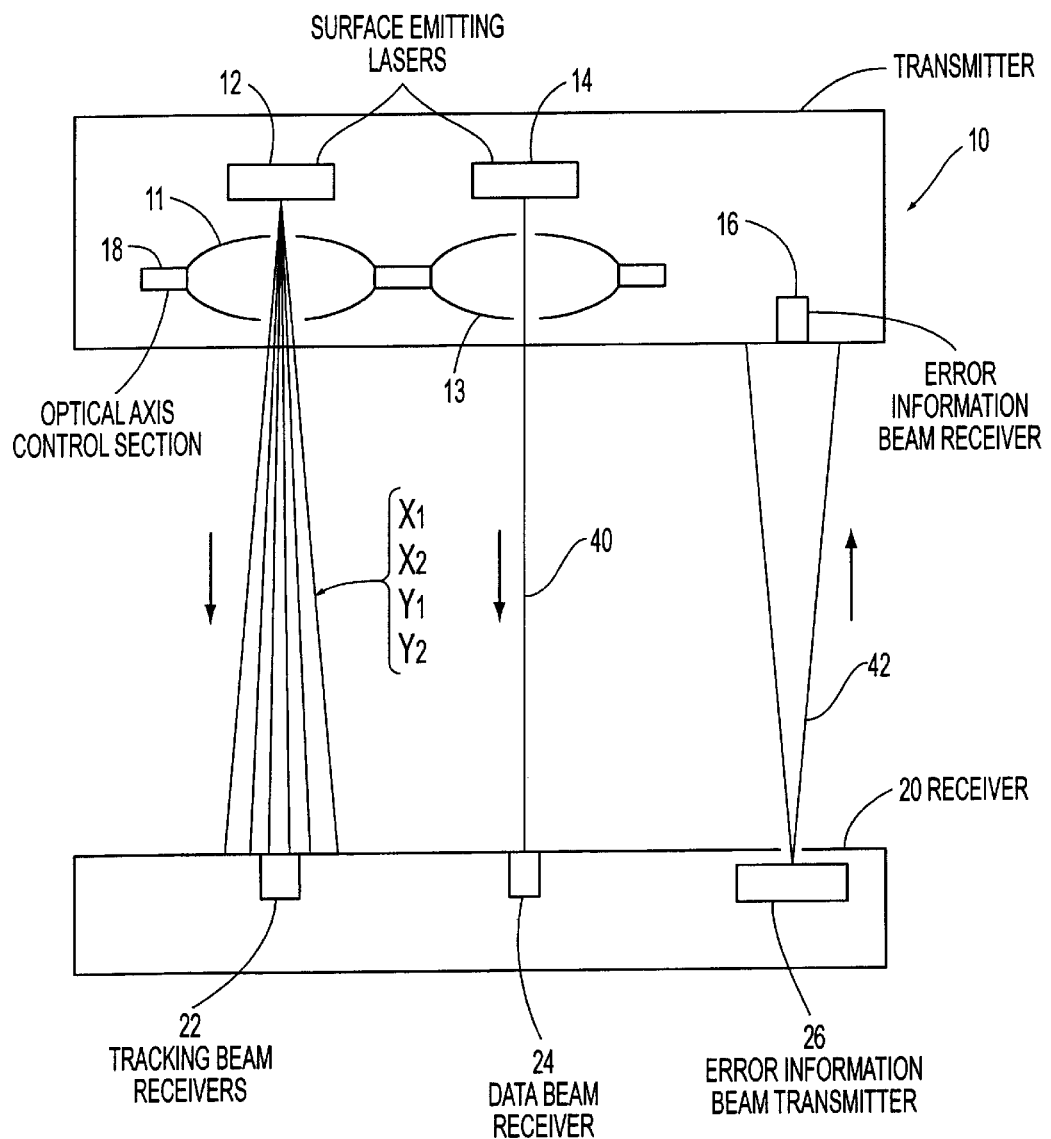
FIG. 1 shows schematically a first embodiment of a spatial optical transmission device.

FIG. 1 shows schematically a first embodiment of a spatial optical transmission device. This spatial optical transmission device includes a transmitter 10 and receiver 20.

Figure 2:
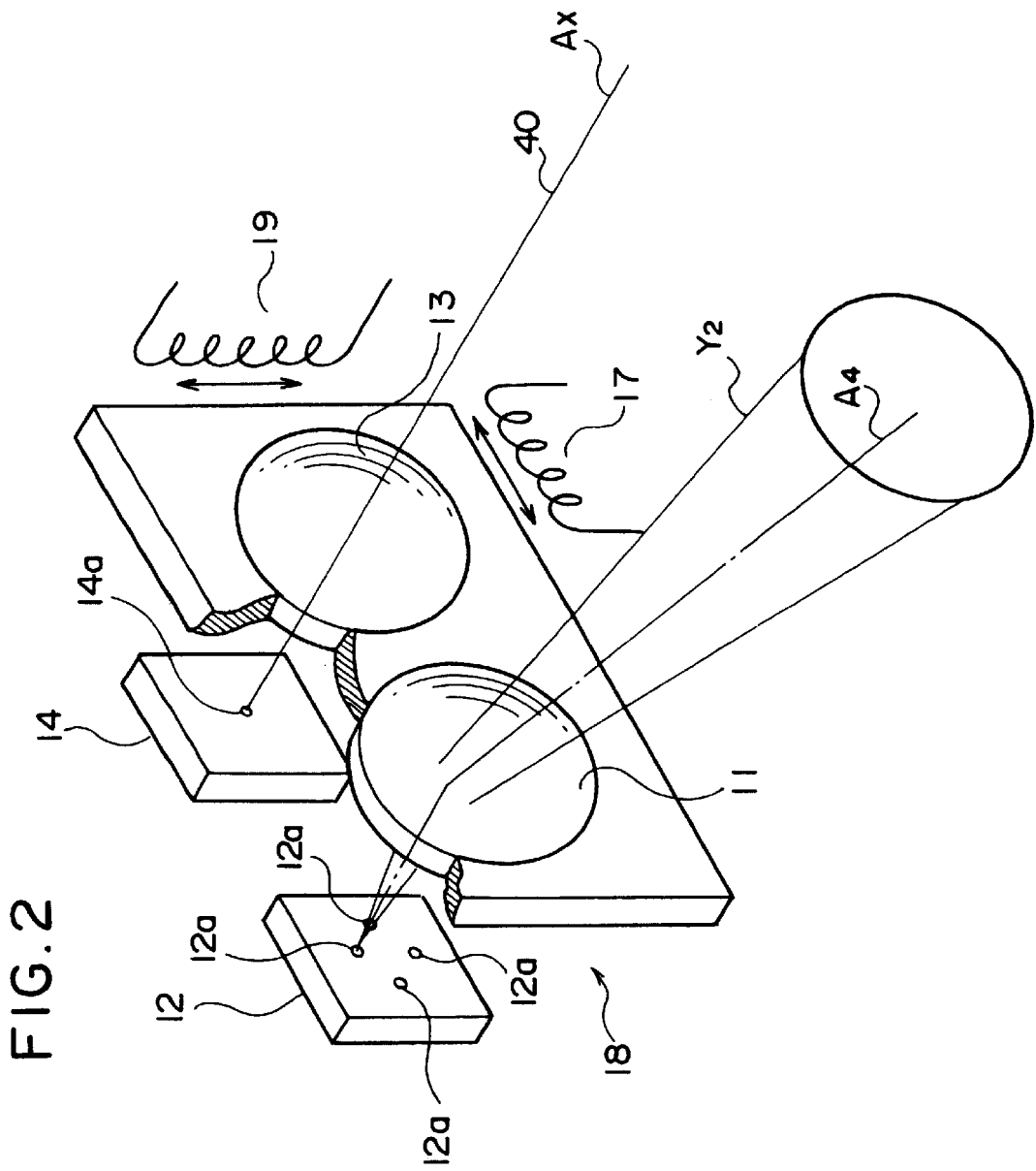
FIG. 2 shows a surface emitting laser and optical axis control section thereof.

The transmitter 10 comprises surface emitting lasers 12 and 14, an error information beam receiver 16, and optical axis control section 18. FIG. 2 shows the surface emitting lasers 12 and 14 and optical axis control section 18.

The surface emitting laser 12 has a plurality of (four) light emitting portions 12a, and each light emitting portion 12a functions as a tracking beam transmitter. From the light emitting portions 12a, tracking beams X1, X2, Y1, and Y2 (see FIG. 3) are emitted. When the light emitted by the light emitting portions 12a passes through a lens 11, it is radiated with a relatively wide angle of divergence. The angle of divergence preferably has a full angle half maximum of at least 5 degrees. More preferably, at least 10 degrees is appropriate.

Figure 3:
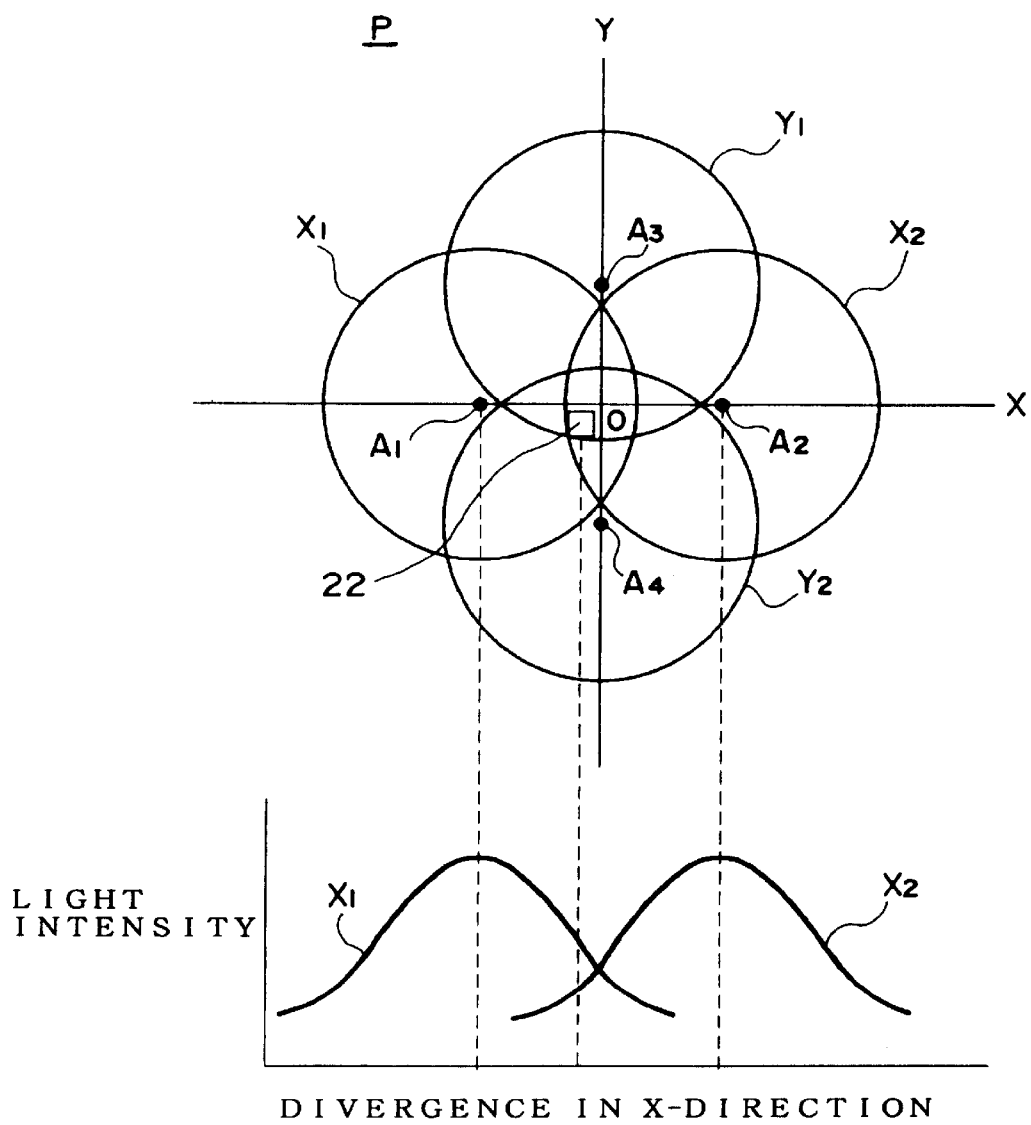
FIG. 3 illustrates tracking beams.

FIG. 3 illustrates the tracking beams. In this figure, a coordinate plane P includes orthogonal X and Y axes. The coordinate plane P is a plane on which the tracking beams X1, X2, Y1, and Y2 are projected, and the X and Y axes have a fixed positional relation with the tracking beams X1, X2, Y1, and Y2.

In the coordinate plane P, the optical axes A1 and A2 of the tracking beams X1, X2 are placed on the X axis at different positions, and the optical axes A3 and A4 of the tracking beams Y1 and Y2 are placed on the Y axis at different positions. Moreover, all of the tracking beams X1, X2, Y1, and Y2 are arranged to be partially overlapping.

An optical intensity of each of the tracking beams X1, X2, Y1, and Y2 shows uneven distribution. An example of the optical intensity distribution of the tracking beams X1 and X2 is shown below the coordinate plane P. As shown here, the tracking beams X1 and X2 have the highest intensity close to the optical axes A1 and A2, and decrease moving away from the optical axes A1 and A2 along the X axis. Similarly, the tracking beams Y1 and Y2 also have the highest intensity close to the optical axes A3 and A4, and decrease moving away from the optical axes A3 and A4 along the Y axis. It should be noted that here the optical intensity indicates the magnitude of the optical energy converted to a current or voltage in the receiving optics.

The surface emitting laser 14 has one light emitting portion 14a, and this light emitting portion 14a functions as the data beam transmitter. Light from the light emitting portion 14a passes through a lens 13 to emerge as a beam of light with a relatively small angle of divergence. The angle of divergence of this data beam 40 is preferably less than the angle of divergence of the tracking beams X1, X2, Y1, and Y2. It is preferable for the angle of divergence of the beam to have a full angle half maximum of not more than 5 degrees. More preferably, it should be not more than 3 degrees. The data beam 40 emitted from the light emitting portion 14a transfers data from the transmitter 10 to the receiver 20.

The surface emitting lasers 12 and 14, as is well known, allow the light direction to be easily aligned, and moreover, even to form the plurality of light emitting portions 12a as in the surface emitting laser 12 does not entail a great increase in manufacturing complexity.

The optical axis control section 18, as shown in FIG. 2, includes the two lenses 11 and 13, and actuators 17 and 19.

The tracking beams X1, X2, Y1, and Y2 from the light emitting portions 12a which functions as the tracking beam transmitters pass through the one lens 11. More specifically, the tracking beams X1, X2, Y1, and Y2 pass through positions off the axis of the lens 11 and are refracted. For example, in FIG. 2, the light emitting portion 12a in the upper position emits the tracking beam Y2, which is refracted by the lens 11 and deflected downward from the axis of the lens 11 along the optical axis A4.

The data beam 40 emitted from the light emitting portion 14a which functions as the data beam transmitter passes through the other lens 13. The optical axis Ax of the data beam 40 passes through a position off the axis of the lens 13 corresponding to the movement of the lens 11.

The actuators 17 and 19 are arranged to move the lenses 11 and 13 simultaneously in two dimensions in the plane orthogonal to the optical axes passing through the centers of the lenses 11 and 13. When the lenses 11 and 13 are moved, the directions of the optical axes (for example A4) of the tracking beams (for example Y2) and the optical axis Ax of the data beam 40 change as their positions with respect to the centers of the lenses 11 and 13 change. In this way, the optical axis control section 18 controls the optical axes A1 to A4 of the tracking beams X1, X2, Y1, and Y2, and the optical axis Ax of the data beam 40.

The error information beam receiver 16 shown in FIG. 1 includes a receiving optics, and converts optical energy into a current or voltage. The error information beam receiver 16 has a relatively large light-receiving area, of the order of 1 $cm^2$. Therefore, since the electrical capacitance of the element in the error information beam receiver 16 is large, it is not adapted to receive a high frequency modulated light signal, but is appropriate for receiving a light beam which has diverged with a consequent reduction in the energy density. The error information beam receiver 16 receives an error information beam 42 emitted from an error information beam transmitter 26 of the receiver 20.

Next the receiver 20 is described. The receiver 20 comprises a tracking beam receiver 22, a data beam receiver 24, and the error information beam transmitter 26.

The tracking beam receiver 22 receives the tracking beams X1, X2, Y1, and Y2. Since the tracking beams X1, X2, Y1, and Y2 are divergent beams, the tracking beam receiver 22 has a relatively large light receiving area, of the order of 1 cm². By this means, a large amount of optical energy can be converted into electrical energy.

Since the data beam 40 is a beam of light with a small angle of divergence, the data beam receiver 24 has a relatively small light receiving area of the order of 0.1 mm². In this way, the amount of optical energy which can be converted to a current or voltage is small, but a light signal modulated at a high frequency can be converted to a high frequency electrical signal.

The error information beam transmitter 26 emits the divergent type error information beam 42. The light source for emitting the divergent beam may be a light-emitting diode.

This embodiment is constructed as described above, and its operation is now described. FIGS. 4A to 4D illustrate the operation of this embodiment.

First, as shown in FIG. 4A, the tracking beams X1, X2, Y1, and Y2 are emitted in sequence as pulses from the light emitting portions 12a functioning as the tracking beam transmitters (see FIG. 2) to the tracking beam receiver 22 (see FIG. 1).

It should be noted that the tracking beams X1, X2, Y1, and Y2 may be emitted at fixed intervals. Alternatively, the tracking beams X1 and X2 may be emitted continuously, and the tracking beams Y1 and Y2 emitted after intervals.

The tracking beam receiver 22 receives the tracking beams X1, X2, Y1, and Y2 in sequence, and converts each optical intensity to a corresponding current or voltage. Even if the tracking beams X1, X2, Y1, and Y2 have the same optical intensity at the point of emission, they will not necessarily be the same at the tracking beam receiver 22. For this reason, as shown in FIG. 4B, the magnitude of the current or voltage value obtained by converting the optical intensity is different for each pulse.

From the signal shown in FIG. 4B, the tracking beam receiver 22 can be determined to be at the position shown in FIG. 3. In other words, as shown in FIG. 3, the optical intensity of each of the tracking beams X1 and X2 is unevenly distributed along the X axis. This distribution is highest close to the optical axes A1 and A2, and becomes lower moving away along the X axis. Therefore, by comparing the intensity of the tracking beams X1 and X2, since X1 is larger, it can be determined whether the tracking beam receiver 22 is positioned close to the optical axis A1 of the tracking beam X1. Then by finding the difference between the value corresponding to the tracking beam X1 and the value corresponding to the tracking beam X2, the positional difference between the tracking beam receiver 22 and the origin O on a coordinate plane P forming a datum point can be found. In this way, X coordinate error information is obtained.

Similarly, for the tracking beams Y1 and Y2, the Y coordinate error information is obtained.

Next, the X coordinate error information and Y coordinate error information is digitized, and by means of the error information beam 42 as shown in FIG. 1, is, as shown in FIG. 4C, transmitted from the receiver 20 to the transmitter 10.

Based on the X coordinate error information and Y coordinate error information, the transmitter 10 controls the optical axis of the tracking beams so that the tracking beam receiver 22 is positioned at the origin O shown in FIG. 3. Specifically, based on the X coordinate error information and Y coordinate error information, the actuators 17 and 19 (see FIG. 2) are actuated according to the positional difference between the tracking beam receiver 22 and the origin O. In more detail, based on the X coordinate error information and Y coordinate error information, as shown in FIG. 4D, an X-axis control voltage and Y-axis control voltage are computed, and supplied to the actuators 17 and 19.

In this way, by means of the actuators 17 and 19, the lens 11 is translated, and the optical axes A1 to A4 of the tracking beams are moved. With this, the coordinate plane P shown in FIG. 3 also moves. Thus the position of the tracking beam receiver 22 is caused to coincide with the origin O.

In this embodiment, the lens 13 is moved together with the lens 11. In other words, when the optical axes A1 to A4 of the tracking beams change, the optical axis of the data beam 40 also changes in the same direction. In the receiver 20, the positions of the tracking beam receiver 22 and the data beam receiver 24 are such that when the position of the tracking beam receiver 22 coincides with the origin O, the optical axis of the data beam 40 is aligned with the data beam receiver 24.

Therefore, as described above, by making the position of the tracking beam receiver 22 coincide with the origin O, the optical axis of the data beam 40 can be aligned with the data beam receiver 24. Since this control is carried out at a specified interval, the optical axis is in effect constantly adjusted.

Figure 5:
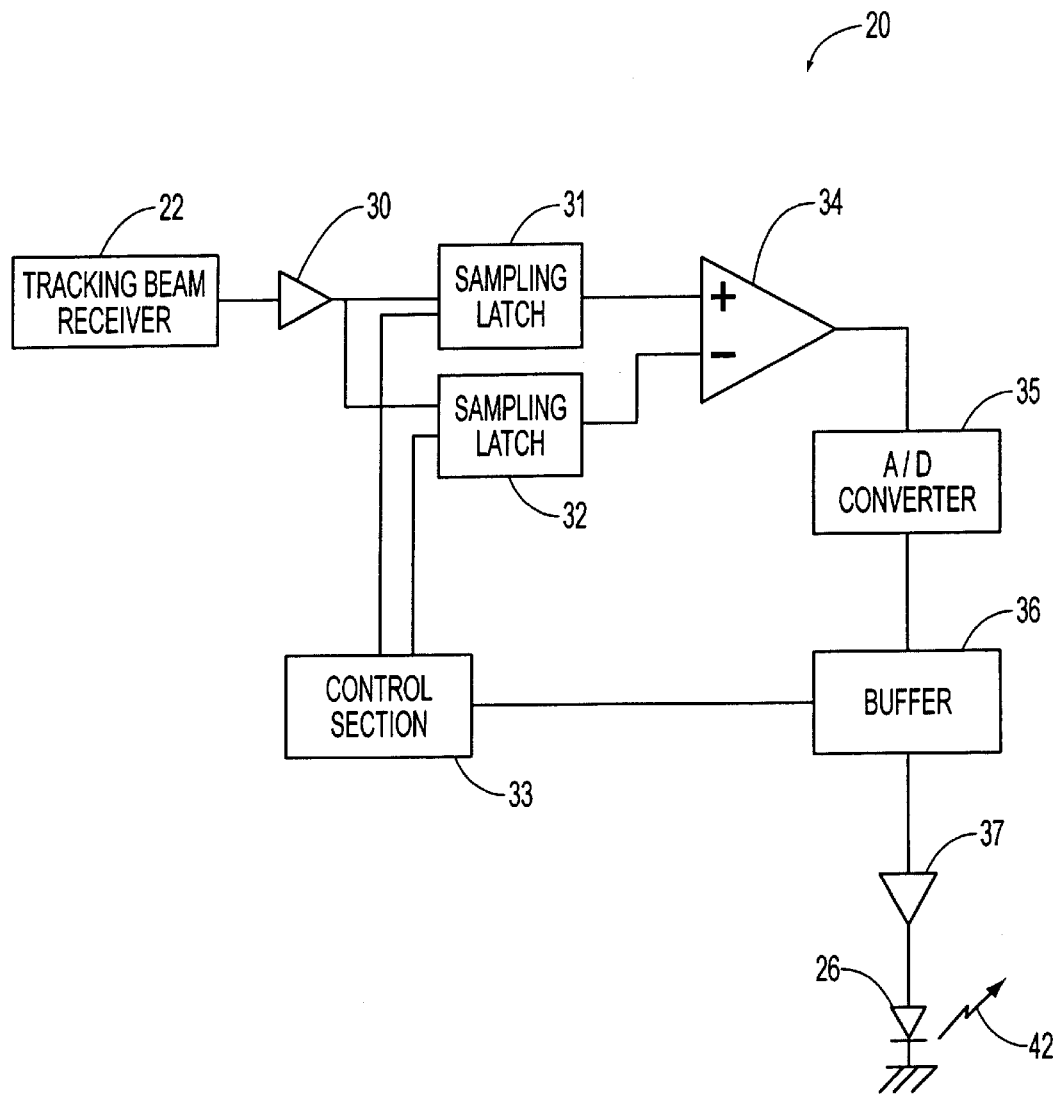
FIG. 5 shows a circuit in the receiver from receiving the tracking beams to emitting the error information beam.

Next, FIG. 5 shows the circuit in the receiver from receiving the tracking beams to emitting the error information beam. In this figure, when the tracking beam receiver 22 receives the tracking beams, it outputs a current depending on the intensity thereof, and depending on the size of the current, a voltage is generated by a current-voltage transducer 30. Then, first, a voltage corresponding to the tracking beam X1 is held in a sampling latch 31, and a voltage corresponding to the tracking beam X2 is held in another sampling latch 32. Which of the sampling latches 31 and 32 has the voltage held is controlled by a control section 33. The voltages of the sampling latches 31 and 32 are simultaneously applied to a differential amplifier 34, and an analog signal is output depending on the voltage difference. This analog signal is converted to a digital signal by an A/D converter 35, and held in a buffer 36 under the control of the control section 33. This digital signal constitutes the X coordinate error information.

Next, the Y coordinate error information is generated in a similar way, and held in the buffer 36. Then under the control of the control section 33, the X coordinate error information and Y coordinate error information is output successively to a driver 37, and the error information beam 42 is emitted from the error information beam transmitter 26 as error information. The error information beam 42 is received by the error information beam receiver 16 of the transmitter 10.

Figure 6:
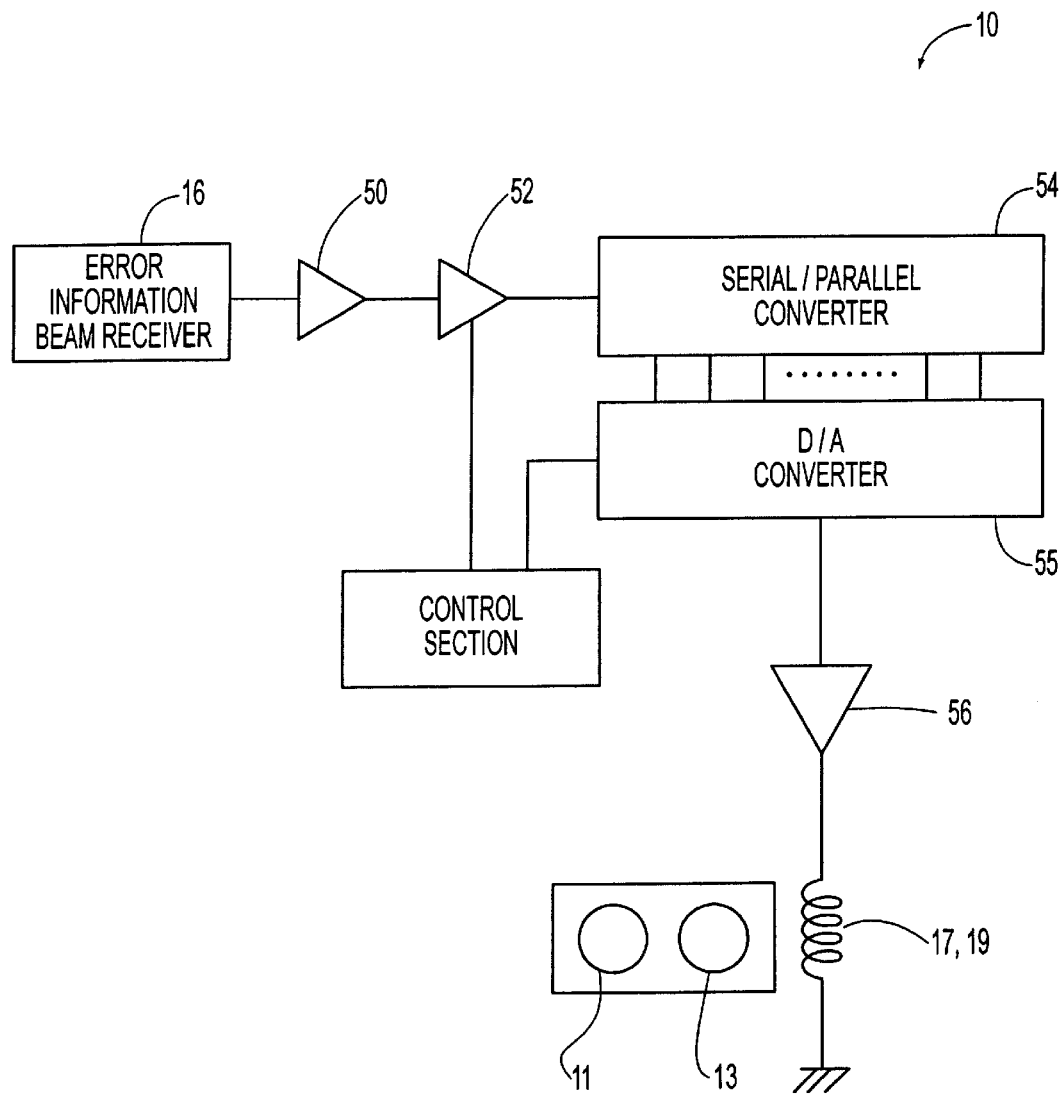
FIG. 6 shows a circuit in the transmitter from receiving the error information beam to adjusting the optical axis.

FIG. 6 shows a circuit in the transmitter from receiving the error information beam to adjusting the optical axis. In this figure, when the error information beam receiver 16 receives the error information beam 42, a current corresponding to the intensity thereof is output. According to the magnitude of this current, a voltage signal is generated by a current-voltage transducer 50, the necessary signals only are selected by a data separator 52, and output to a serial/parallel converter 54, where the serial input signal is converted to a parallel signal. This parallel signal is input to a D/A converter 55, and an analog signal corresponding to the parallel signal is output. In this way, an X-axis control voltage and Y-axis control voltage (see FIG. 4D) can be obtained, and through a driver 56, these voltages are applied to the actuators 17 and 19. The actuators 17 and 19 move the lenses 11 and 13 in a translation movement.

In this way, the optical axes A1 to A4 of the tracking beams are controlled, and also the optical axis of the data beam 40 is controlled, to allow optical transmission from the transmitter 10 to the receiver 20. According to this embodiment, no complex algorithm is required, and with a simple construction the data beam 40 can be received.

Second Embodiment

Figure 7:
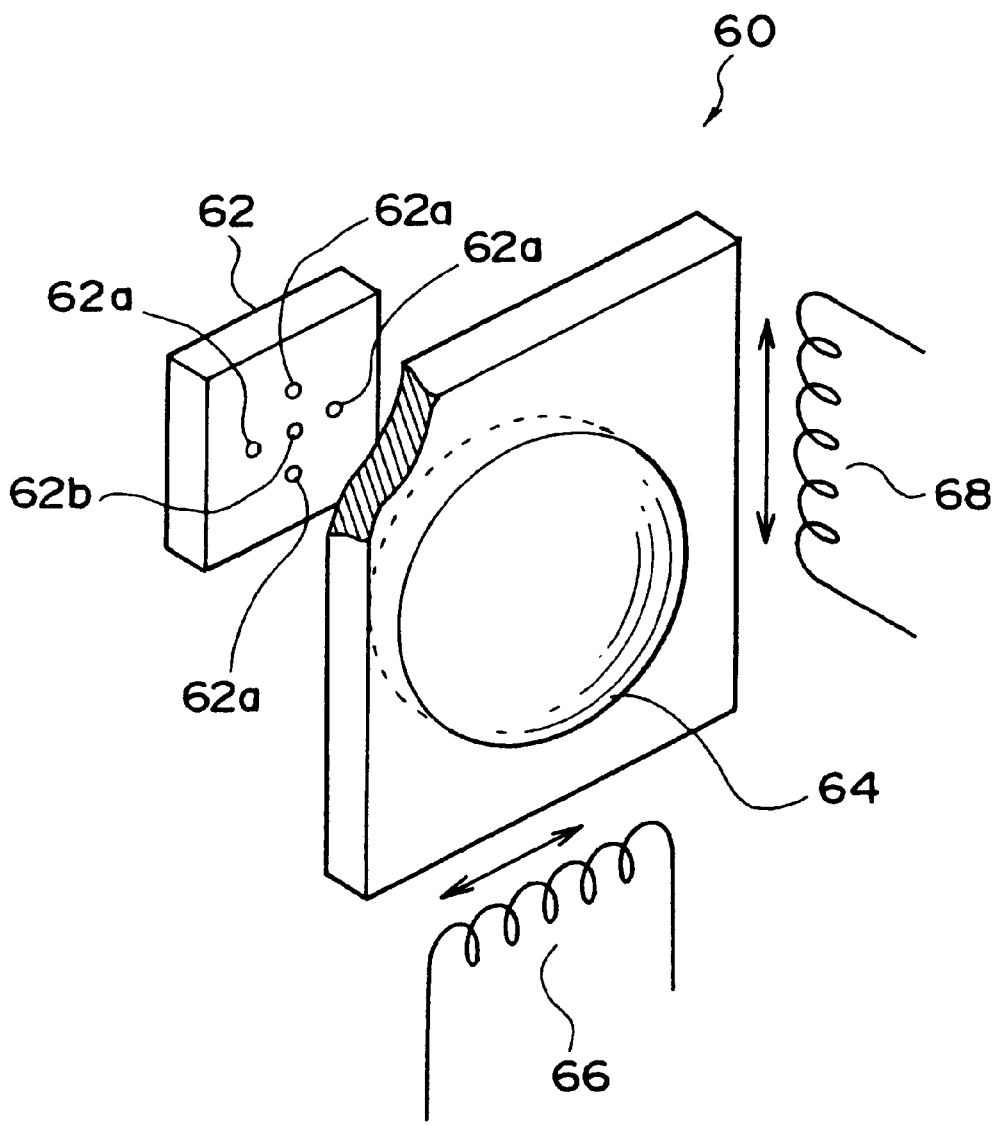
FIG. 7 shows a second embodiment of an optical axis control section.

FIG. 7 shows a second embodiment of the optical axis control section. The optical axis control section 60 shown in this figure can be used in place of the optical axis control section 18 shown in FIG. 2. The optical axis control section 60 includes a surface emitting laser 62, a lens 64 and actuators 66 and 68.

In this embodiment, the surface emitting laser 62 has four light emitting portions 62a that function as tracking beam transmitters, and a light emitting portion 62b functioning as a data beam transmitter. Since even with the extra number of light emitting portion the process of fabricating the surface emitting laser is not greatly affected, the light emitting portions 62a and 62b may be formed on the one surface emitting laser 62 as described here.

In this embodiment, by means of a single lens 64, the optical axes of the tracking beams and data beam can be adjusted.

Third Embodiment

Figure 8:
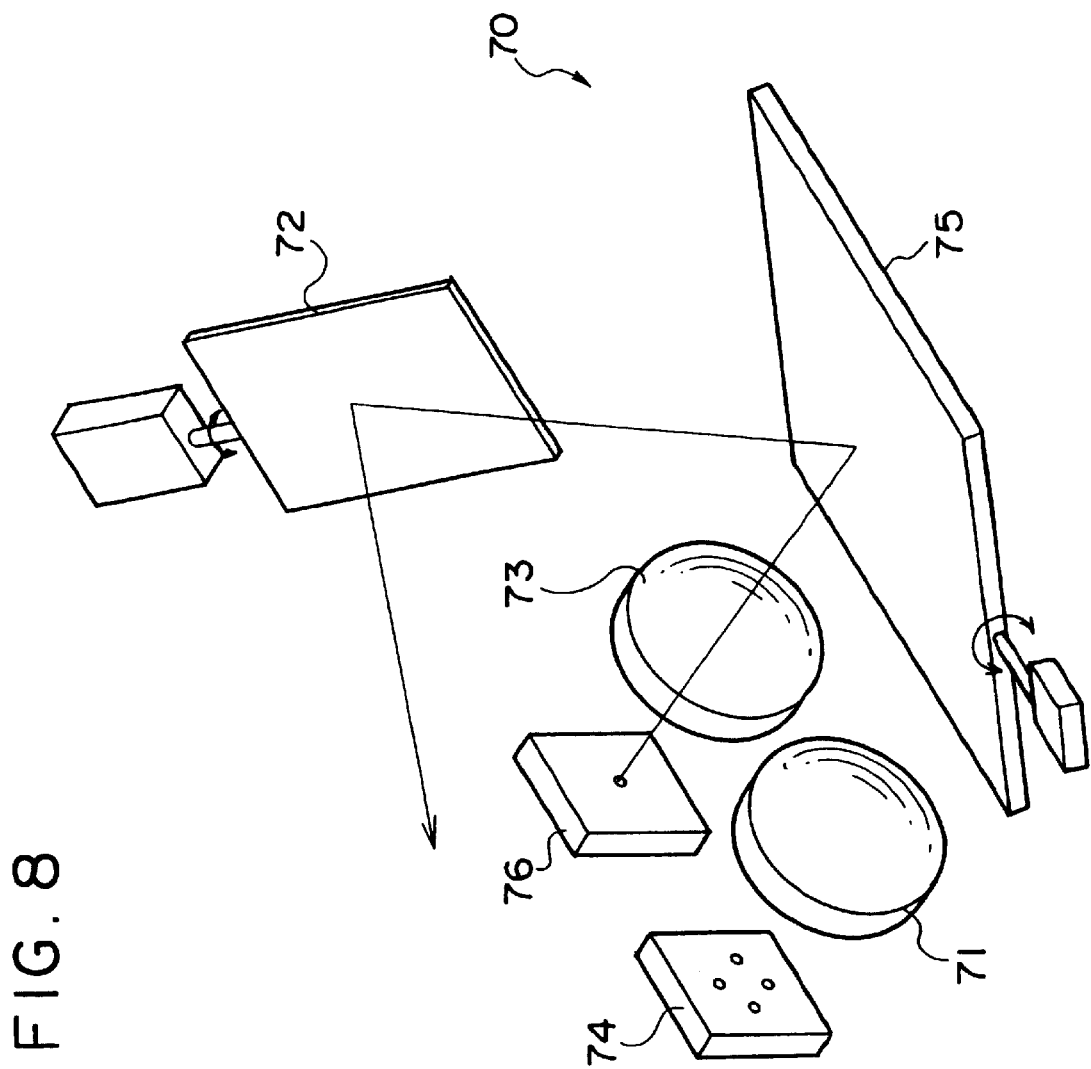
FIG. 8 shows a third embodiment of an optical axis control section.

FIG. 8 shows a third embodiment of the optical axis control section. The optical axis control section 70 shown in this figure includes two galvanometer mirrors 72 and 75 each capable of varying the angle of a mirror about an axis of rotation. By means of the two galvanometer mirrors 72 and 75, control in the two X and Y axes is possible. In this embodiment, the positional relation of surface emitting lasers 74 and 76 and lenses 71 and 73 is fixed. It should be noted that the surface emitting lasers 74 and 76 are constructed similarly to the surface emitting lasers 12 and 14 shown in FIG. 2.

By means of the galvanometer mirrors 72 and 75, the optical axis adjustment can be carried out.

Fourth Embodiment

Figure 9:
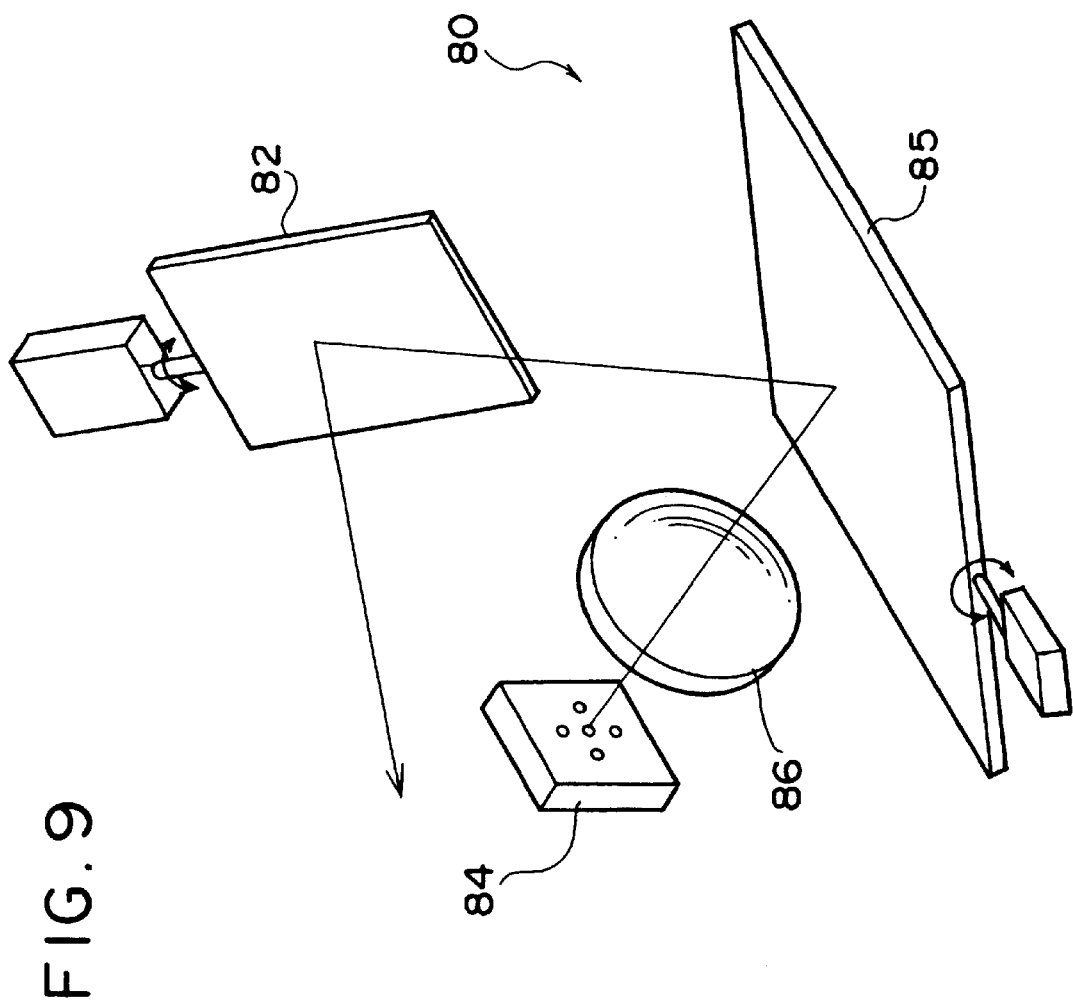
FIG. 9 shows a fourth embodiment of an optical axis control section.

FIG. 9 shows a fourth embodiment of an optical axis control section. The optical axis control section 80 shown in this figure includes galvanometer mirrors 82 and 85. A surface emitting laser 84 shown in this figure is constructed similarly to the surface emitting laser 62 shown in FIG. 7, and by means of a lens 86, the optical axis adjustment can be carried out.

What is claimed is:

1. A spatial optical transmission device comprising:
   a transmitter which has a plurality of tracking beam transmitters of a divergent type for emitting light at a wide angle, a data beam transmitter of a beam type for emitting light at a narrow angle, an error information beam receiver, and an optical axis control section; and
   a receiver which has a tracking beam receiver, a data beam receiver, an error information generation section, and an error information beam transmitter of a divergent type;
   wherein said tracking beam transmitters emit light beams toward a coordinate plane that has a plurality of coordinate axes and has a fixed relative positional relation with said tracking beam transmitters; the optical axes of at least two of said light beams emitted from said tracking beam transmitters are placed on each coordinate axis at different positions; and adjacent light beams among said light beams partially overlap on one of said coordinate axes, the optical intensity of each of said light beams emitted from said tracking beam transmitters showing uneven distribution;
   wherein said tracking beam receiver is positioned in said coordinate plane, receives said light beams from said tracking beam transmitters, and detects the intensity thereof;
   wherein said error information generation section calculates positional difference between said tracking beam receiver and a datum point of said coordinate plane based on the detected intensity of said light beams, and generates error information;
   wherein said error information beam transmitter transmits said error information to said error information beam receiver; and
   wherein said optical axis control section controls the optical axes of said light beams from said tracking beam transmitters based on said error information so that said tracking beam receiver is positioned at said datum point in said coordinate plane, and also controls the optical axis of the light beam from said data beam transmitter to correspond with said data beam receiver.

2. The spatial optical transmission device as defined in claim 1,
   wherein the intensity of each of said light beams emitted from said tracking beam transmitters is distributed such that the intensity decreases further from said optical axis.

3. The spatial optical transmission device as defined in claim 1,
   wherein said light beams from said tracking beam transmitters are emitted sequentially one at a time.

4. The spatial optical transmission device as defined in claim 3,
   wherein said error information is generated after signals based on all of said light beams emitted one at a time have been sequentially sampled and latched.

5. The spatial optical transmission device as defined in claim 1,
   wherein said error information generation section, based on the detected intensity of said light beams, generates intensity signals for each of said tracking beam transmitters, calculates the difference in said intensity signals for at least two of said light beams whose optical axes are positioned on the same coordinate axis, and generates coordinate error information for each coordinate axis; and
   wherein said error information comprises all of said coordinate error information.

6. The spatial optical transmission device as defined in claim 1, further comprising:
   at least one lens through which said light beams from said tracking beam transmitters and said data beam transmitter pass;
   wherein said optical axis control section drives said lens, and controls the optical axes of said light beams from said tracking beam transmitters and said data beam transmitter.

7. The spatial optical transmission device as defined in claim 6,
   wherein said optical axis control section moves said lens in a translation movement.

8. The spatial optical transmission device as defined in claim 7,
   wherein said optical axis control section includes an electromagnetic actuator which moves said lens in a translation movement.

9. The spatial optical transmission device as defined in claim 1,
   wherein said optical axis control section includes a galvanometer mirror which reflects said light beams from said tracking beam transmitters and said data beam transmitter, and changes the direction of the optical axes of said light beams.

10. The spatial optical transmission device as defined in any of claims 1 to 9,
    wherein at least one of said tracking and data beam transmitters is a light emitting portion of a surface emitting laser.

11. The spatial optical transmission device as defined in claim 10,
    wherein said surface emitting laser includes a plurality of light emitting portions; and
    wherein one of said light emitting portions forms said data beam transmitter, while the remainders form said tracking beam transmitters.

12. A method of spatial optical transmission, comprising the steps of:
    emitting a plurality of divergent tracking beams at a wide angle from a transmitter, said tracking beams having a fixed relative positional relation with a plurality of coordinate axes of a coordinate plane;
    emitting a data beam at a narrow angle from a data beam transmitter;
    receiving said tracking beams on said coordinate plane by means of a light receiving portion of a receiver, and calculating the positional difference between said light receiving portion and a datum point to generate error information;
    transmitting said error information from said receiver to said transmitter; and
    controlling optical axes of said tracking beams and said data beam on the basis of said error information;
    wherein the optical axis of at least two of said tracking beams are placed on each coordinate axis at linearly different positions;
    wherein adjacent tracking beams among said tracking beams partially overlap on one of the coordinate axes, the optical intensity of each of said tracking beams transmitted from said tracking beam transmitters shows uneven distribution, the intensity is detected by means of reception of the tracking beams by said light receiving portion of said receiver, and the positional difference between said light receiving portion and a datum point on said coordinate plane is calculated based on the detected intensity to generate said error information; and
    wherein based on said error information, said optical axes of said tracking beams are controlled so that said light receiving portion coincides with said datum point, and the optical axis of said data means is also controlled.

13. The method of spatial optical transmission as defined in claim 12,
    wherein each of said tracking beams has a distribution such that the intensity decreases further from said optical axis.

14. The method of spatial optical transmission as defined in claim 12,
    wherein said tracking beams are emitted sequentially one at a time.

15. The method of spatial optical transmission as defined in any of claims 12 to 14,
    wherein based on the detected intensity of said tracking beams, an intensity signal for each of said tracking beams is generated, the difference in said intensity signal for said tracking beams whose optical axes are positioned on the same coordinate axis is calculated, and coordinate error information for each of said coordinate axes is generated; and
    wherein said error information comprises all of said coordinate error information.

16. The method of spatial optical transmission as defined in claim 15,
    wherein the intensity of each of said tracking beams is detected as an analog signal, said analog signal is converted to a digital signal to be used to calculate said error information, and in the transmitter said error information is converted to an analog signal to be used to control the optical axes of said tracking beams and said data beam.

* * * * *

UNITED STATES PATENT AND TRADEMARK OFFICE
CERTIFICATE OF CORRECTION

PATENT NO. : 6,219,133 B1
DATED : April 17, 2001
INVENTOR(S) : Takeo Kawase et al.

It is certified that error appears in the above-identified patent and that said Letters Patent is hereby corrected as shown below:

<u>Title page,</u>
Item [75], change the second inventor, Shojiro Kitamura's residence from "Sawa (JP)" to -- Suwa-shi (JP) --.

Signed and Sealed this

Twenty-second Day of January, 2002

Attest:

*Attesting Officer*

JAMES E. ROGAN
*Director of the United States Patent and Trademark Office*